US010027457B2

(12) United States Patent
Guzelgoz et al.

(10) Patent No.: US 10,027,457 B2
(45) Date of Patent: Jul. 17, 2018

(54) METHODS AND APPARATUS FOR PROVIDING SOFT AND BLIND COMBINING FOR PUSCH CQI PROCESSING

(71) Applicants: Sabih Guzelgoz, San Jose, CA (US); Hongjik Kim, Los Gatos, CA (US); Tejas Maheshbhai Bhatt, Sunnyvale, CA (US); Fariba Heidari, San Jose, CA (US)

(72) Inventors: Sabih Guzelgoz, San Jose, CA (US); Hongjik Kim, Los Gatos, CA (US); Tejas Maheshbhai Bhatt, Sunnyvale, CA (US); Fariba Heidari, San Jose, CA (US)

(73) Assignee: Cavium, Inc., San jose ( * ) Notice: Subject to any disclaimer, the term of this patent is extended or adjusted under 35 U.S.C. 154(b) by 181 days.

(21) Appl. No.: 15/159,729

(22) Filed: May 19, 2016

(65) Prior Publication Data
US 2017/0171854 A1 Jun. 15, 2017

Related U.S. Application Data

(60) Provisional application No. 62/267,221, filed on Dec. 14, 2015.

(51) Int. Cl.
G06F 11/00 (2006.01)
H04J 1/16 (2006.01)
H04L 1/00 (2006.01)
H04L 12/26 (2006.01)
H04L 5/00 (2006.01)
(Continued)

(52) U.S. Cl.
CPC .......... *H04L 5/0055* (2013.01); *H04L 1/0026* (2013.01); *H04L 1/0035* (2013.01); *H04L 1/1664* (2013.01); *H04L 5/0057* (2013.01); *H04L 25/067* (2013.01); *H04W 72/121* (2013.01); *H04W 72/1268* (2013.01)

(58) Field of Classification Search
CPC ... H04L 5/0055; H04L 1/0035; H04L 1/0026; H04L 1/1664; H04L 25/067; H04L 5/0057; H04W 72/1268; H04W 72/121
USPC .................. 370/329, 330, 252, 253, 254
See application file for complete search history.

(56) References Cited

U.S. PATENT DOCUMENTS 9,048,986 B2 * 6/2015 Liu ................. H04L 1/1893
9,370,021 B2 * 6/2016 Love ............... H04L 5/0041
(Continued)

Primary Examiner — Chuong T Ho
(74) Attorney, Agent, or Firm — James M. Wu; JW Law Group

(57) ABSTRACT

Methods and apparatuses for providing soft and blind combining for PUSCH CQI processing are disclosed. In an exemplary embodiment, a method includes generating a plurality of hypothetical rank indicator (RI) values associated with a user equipment (UE), and concurrently soft-combining channel quality information (CQI) and RI information associated with the UE that is contained in a received subframe of symbols. The RI information is soft-combined to generate a soft-combined RI bit stream and the CQI information is soft-combined based on the plurality of hypothetical RI values to generate a plurality of soft-combined CQI bit streams, respectively. The method also includes decoding the soft-combined RI bit stream to generate a decoded RI value, and decoding a selected soft-combined CQI bit stream based on the decoded RI value to generate a decoded CQI value.

23 Claims, 9 Drawing Sheets

(51) Int. Cl.
*H04L 1/16* (2006.01)
*H04W 72/12* (2009.01)
*H04L 25/06* (2006.01)

(56) References Cited

U.S. PATENT DOCUMENTS

| | | | |
|---|---|---|---|
| 9,680,607 B2* | 6/2017 | Nammi | H04L 1/0073 |
| 2010/0029289 A1* | 2/2010 | Love | H04L 5/0041 |
| | | | 455/450 |
| 2013/0039292 A1* | 2/2013 | Liu | H04L 1/1893 |
| | | | 370/329 |
| 2013/0155973 A1* | 6/2013 | Geirhofer | H04B 7/0632 |
| | | | 370/329 |
| 2015/0223207 A1* | 8/2015 | Liu | H04L 1/1893 |
| | | | 370/329 |
| 2015/0249524 A1* | 9/2015 | Nammi | H04L 1/0028 |
| | | | 370/252 |
| 2015/0280801 A1* | 10/2015 | Xin | H04B 7/0478 |
| | | | 370/329 |

* cited by examiner

METHODS AND APPARATUS FOR PROVIDING SOFT AND BLIND COMBINING FOR PUSCH CQI PROCESSING

CLAIM TO PRIORITY

This application claims the benefit of priority based upon U.S. Provisional Patent Application having Application No. 62/267,221, filed on Dec. 14, 2015, and entitled "Method and Apparatus for Providing Soft and Blind Combining Techniques for PUSCH Baseband Processing," which is hereby incorporated herein by reference in its entirety.

FIELD

The exemplary embodiments of the present invention relate to telecommunications networks. More specifically, the exemplary embodiments of the present invention relate to receiving and processing data streams via a wireless communication network.

BACKGROUND

There is a rapidly growing trend toward mobile and remote data access over high-speed communication networks, such as provided by 3G or 4G cellular services. For example, using these services, users now rely on their smartphones for texting, access to email, banking, and social media, and for sending and receiving pictures and video.

Typically, wireless network performance depends in part on the quality of the transmission channel. For example, if the channel conditions are good, the network may perform with higher speed and capacity than when the channel conditions are poor. To obtain the best network performance, wireless networks may rely on user devices to report control information back to the network. The control information includes parameters indicating the channel conditions and/or transmission parameters. For example, one parameter is referred to as a channel quality indicator (CQI) and another parameter is referred to as a rank indicator (RI). One way user devices report control information back to the network is through a physical uplink shared channel (PUSCH). The network receives the control information over this shared channel and uses the received parameters to adjust data transmissions for optimum performance based on the received parameters.

As the control information on the PUSCH is received at a central server on the wireless network, it is processed to obtain the actual control parameters. For example, the processing may include IDFT, demapping, descrambling and combining. However, the parameters in the control information may be interdependent, such that one parameter is used to determine other parameters. For example, conventional systems may fully decode the RI value, so that another parameter, such as the CQI value, can be determined by using the RI value. Thus, conventional systems may receive and inefficiently process the control information in a serial fashion, which may result in reduced performance.

Therefore, it is desirable to have a mechanism that efficiently processes control information in a receiver to overcome the problems of conventional systems.

SUMMARY

In various exemplary embodiments, methods and apparatus for providing soft and blind combining for PUSCH CQI processing are disclosed.

In an exemplary embodiment, a method includes generating a plurality of hypothetical rank indicator (RI) values associated with a user equipment (UE), and concurrently soft-combining channel quality information (CQI) and RI information associated with the UE that is contained in a received subframe of symbols. The RI information is soft-combined to generate a soft-combined RI bit stream and the CQI information is soft-combined based on the plurality of hypothetical RI values to generate a plurality of soft-combined CQI bit streams, respectively. The method also includes decoding the soft-combined RI bit stream to generate a decoded RI value, and decoding a selected soft-combined CQI bit stream based on the decoded RI value to generate a decoded CQI value.

In another exemplary embodiment, an apparatus includes a hypothetical RI generator that generates a plurality of hypothetical rank indicator (RI) values associated with a user equipment (UE). The apparatus also includes a first soft-combiner that soft-combines channel quality information (CQI) associated with the UE that is contained in a received subframe of symbols. The CQI information is soft-combined based on the plurality of hypothetical RI values to generate a plurality of soft-combined CQI bit stream. The apparatus also includes a second soft-combiner that operates concurrently with the first soft-combiner and that soft-combines RI information associated with the UE that is contained in the received subframe of symbols. The RI information is soft-combined to generate a soft-combined RI bit stream. The apparatus also includes a first decoder that decodes the soft-combined RI bit stream to generate a decoded RI value, and a second decoder that decodes a selected soft-combined CQI bit stream based on the decoded RI value to generate a decoded CQI value.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
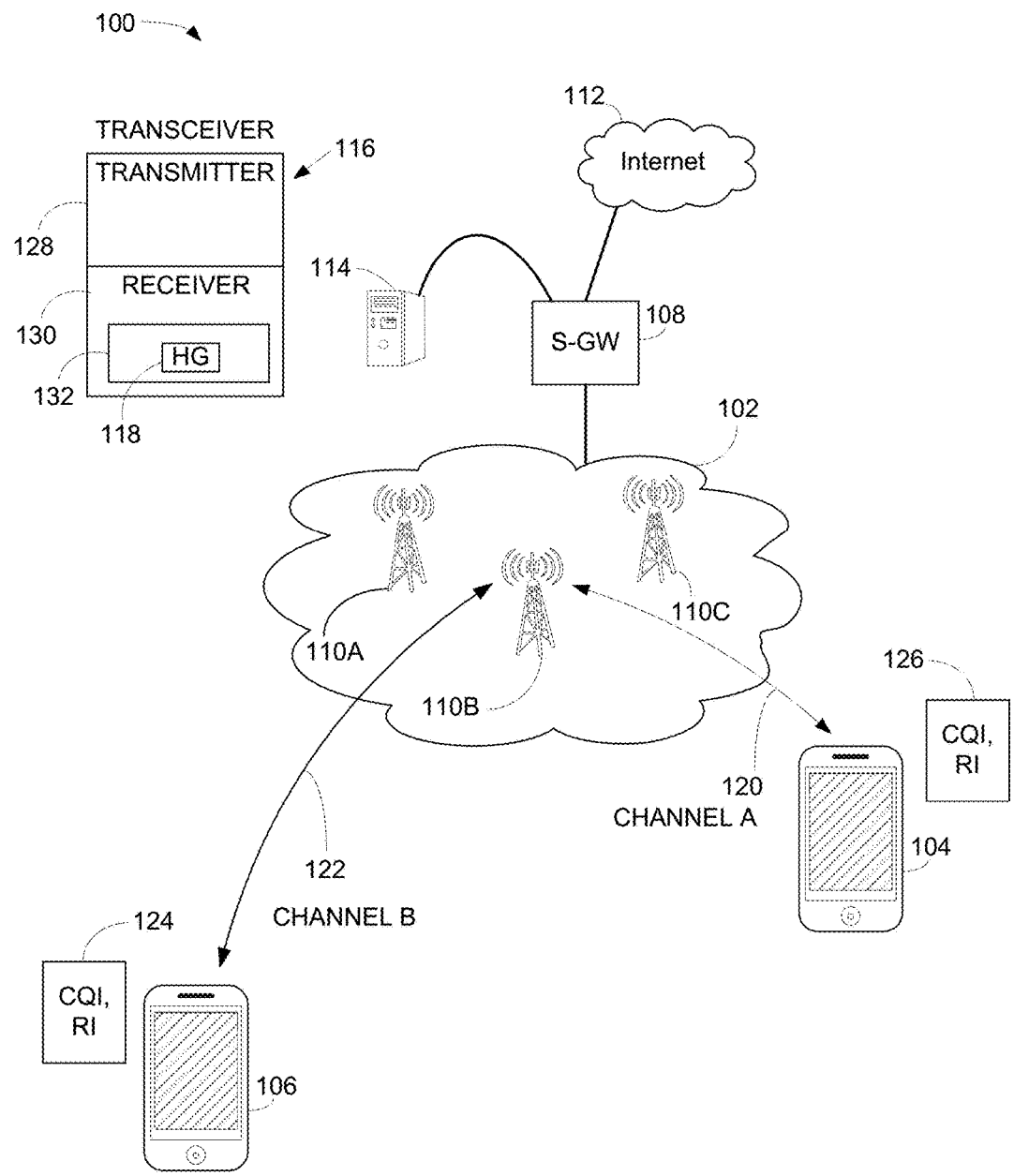
FIG. 1 shows a communication network comprising a transceiver having an exemplary embodiment of a hypothesis generator configured to efficiently receive and process control information from user equipment.

Aspects of the present invention are described herein in the context of methods and/or apparatus for processing control information relating to wireless data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One aspect of the present invention discloses a device capable of hypothesizing possible control information in a wireless communications network. The process includes obtaining a subframe of symbols containing uplink control information via a physical uplink shared channel (PUSCH). In one aspect, the control information includes channel quality indicators (CQIs) and rank indicators (RIs). While soft-combining the RI information from the subframe for RI decoding, a set of possible combined CQI bit streams is generated based on a set of hypothetical (possible) RI values that are generated by a hypothesis generator. After generating the possible combined CQI bit streams, they are stored in a local memory. In one embodiment, the set of possible combined CQI bit streams are decoded and once the RI is decoded, the decoded RI is used to identify a particular decoded CQI value to be output. In another embodiment, the decoded RI is used to identify a particular CQI bit stream to be decoded and output.

FIG. 1 shows a communication network 100 comprising a transceiver 116 having an exemplary embodiment of a hypothesis generator 118 configured to efficiently receive and process control information from user equipment. The network 100 may also be referred to as a third generation (3G), 4G, LTE, or combination of 3G and 4G cellular network configuration.

The communication network 100 includes a server 114 that includes the transceiver 116. The transceiver 116 has a transmitter portion 128 and a receiver portion 130. The server 114 is configured to communicate with a serving gateway (S-GW) 108 that is further configured to communicate with cell site 102 and the Internet 112. The cell site 102 includes radio towers 110 and associated base stations (not shown).

User equipment (UE) 104 is in communication with base station 110B using channel A 120 and user equipment 106 is in communication with base station 110B using channel B 122. For example, the UEs can be cellular phones, handheld devices, tablet computers or iPad® devices. It should be noted that the underlying concepts of the exemplary embodiments of the present invention would not change if one or more blocks (or devices) were added or removed from the communication network 100.

To improve efficiency and/or speed for identifying control information in uplink transmissions via the network 100, one aspect of the present invention is to recover control information concurrently or substantially at the same time. The control information, in one aspect, includes CQI and RI information. For example, the UE 104 generates control information 126 and UE 106 generates control information 124. In an exemplary embodiment, the control information is reported from the UEs 104, 106 to the server 114 in a physical uplink shared channel (PUSCH). It is also possible that the control information is reported to the server 114 in a non-shared channel.

The receiver portion 130 includes receiver processing hardware (RPH) 132. In an exemplary embodiment, the RPH 132 includes the hypothesis generator 118, which is used to facilitate efficient recovery of the control information received from UEs. In one aspect, the HG 118 generates a set of hypothetical (or possible) RI values and associated parameters that are used to concurrently or substantially simultaneously soft-combine the received CQI information while the RI information is also being soft-combined and/or decoded. A set of soft-combined CQI bits streams are generated that are stored in a memory. Once the actual RI value is decoded, the correct CQI bit stream from the range of stored CQI bit streams is selected using the RI value. The selected CQI bit stream is then decoded and output to a subsequent processing stage.

An advantage of using hypothesis generator 118 is that the receiver portion 130 is able to recover the control information from the received subframe quickly to enhance overall efficiency of the receiver and the communication network 100.

Figure 2:
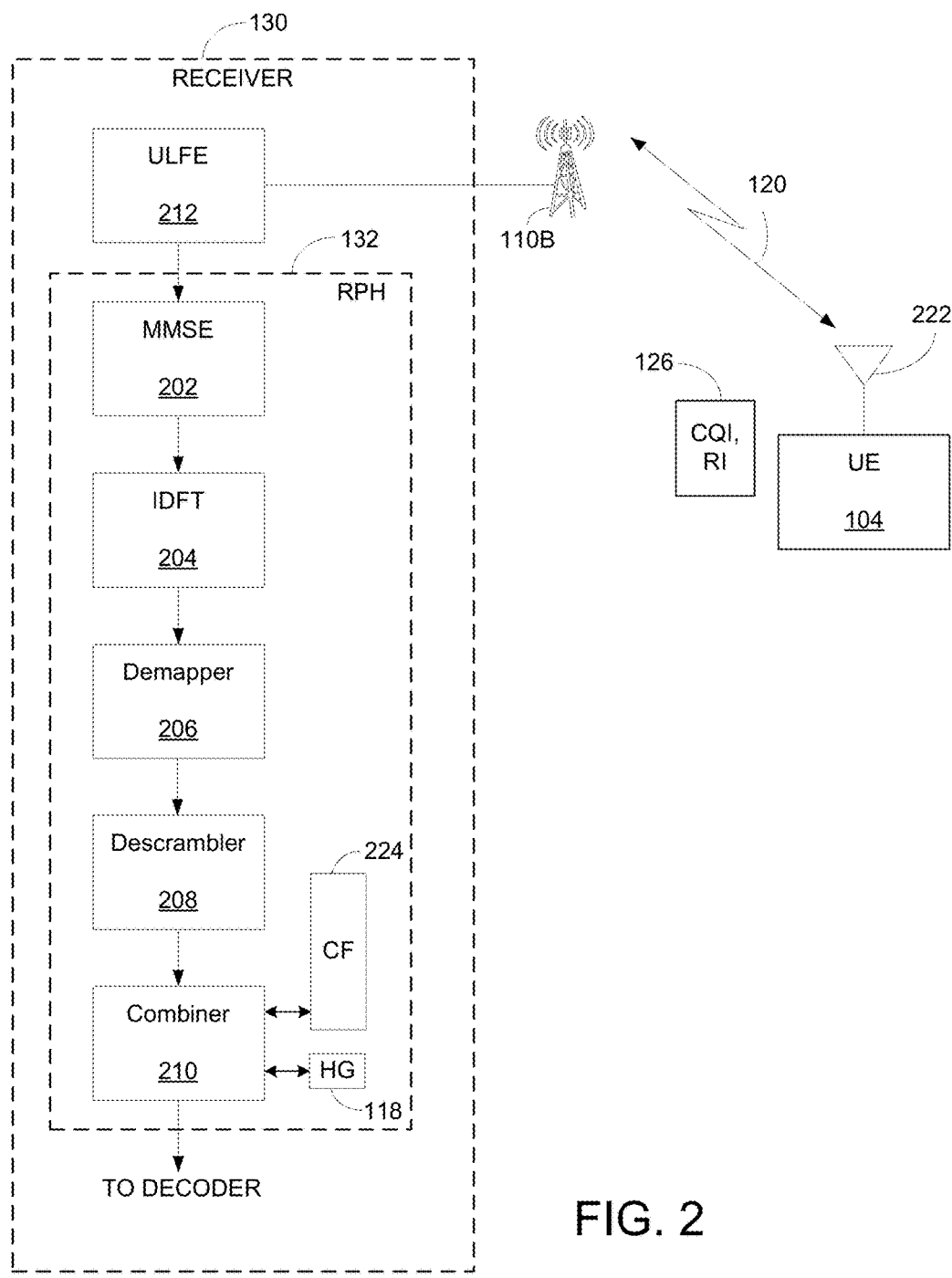
FIG. 2 shows a diagram illustrating an exemplary uplink transmission from a UE through a communication network to a receiver having an exemplary embodiment of a hypothesis generator.

FIG. 2 shows a diagram illustrating an exemplary uplink transmission from a UE through a communication network to a receiver having an exemplary embodiment of the hypothesis generator 118. For example, the uplink transmission from the UE 104 flows through the communication network 100 to the receiver portion 130 of the transceiver 116. It will be assumed that the UE 104 generates the control information 126 and transmits this control information using antenna 222 to the tower 110B, as illustrated by transmission 120. In an exemplary embodiment, the control information 126 is transmitted over a PUSCH to the server 114. The uplink transmission flows to the receiver portion 130 of the transceiver 116. At the receiver portion 130, the uplink transmission is received at an uplink front end (ULFE) 212. After receiving the uplink transmission, the ULFE 212 passes received information to receiver processing hardware (RPH) 132.

The RPH 132, in one exemplary embodiment, includes MMSE 202, IDFT 204, demapper 206, descrambler 208 and combiner 210. In an exemplary embodiment, the RPH 132 includes an exemplary embodiment of the hypothesis generator 118 and configuration parameters (CF) 224. The RPH 132 is configured to process information received by the ULFE 212 and the result of such processing is output to a decoder (not shown). The information includes user data and control information. The control information is used to facilitate information transmission over a wireless communication network, such as the network 100.

The MMSE 202, in one example, includes an equalizer with serial interference cancellation ("SIC") capability. The MMSE 202 generates estimated values using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive simultaneously.

The IDFT 204 converts symbols or samples between frequency domains. After conversion, the IDFT 204 may store the symbols or samples in a storage matrix (not shown). Depending on the application, the IDFT 204 passes the symbols to the next logic block, which is the demapper 206. The storage matrix is a local storage memory which can reside in the IDFT 204, the demapper 206, or at an independent storage location.

The Demapper 206 operates to demap or ascertain soft bit information associated with received symbol(s) or bit stream (s). For example, demapper 206 employs a soft demapping principle, which is based on computing the log-likelihood ratio (LLR) of a bit that quantifies the level of certainty as to whether it is a logical zero or one. To reduce noise and interference, the demapper 206 is also capable of discarding one or more unused constellation points relating to the frequency of the bit stream from the constellation map.

The descrambler 208 is configured to generate and descramble a sequence of bits or a stream of bits. For example, after generating a sequence in accordance with the input value, the descrambler determines whether sequence modification is needed for certain categories of control information. The stream of bits or sequence is subsequently descrambled to produce a set of descrambled soft bits.

The combiner 210 provides a combining function that combines LLR bits to form bit streams to be decoded. For example, the combiner 210 combines CQI LLR bits from a subframe to form a combined CQI bit stream to be decoded by a downstream decoder. In an exemplary embodiment, the control information represent CQI and RI information transmitted from the UE 104.

In an exemplary embodiment, the RPH 132 includes an exemplary embodiment of the hypothesis generator (HG) 118. As disclosed in greater detail below, the HG 118 operates to improve the speed and efficiency of the combiner 210 by providing for concurrent or simultaneous soft-combining of RI and CQI information to recover the CQI information from each UE in a faster and more efficient process. The resulting CQI value is passed to a downstream decoder. The RPH 132 also includes CF 224 that provides configuration parameters to the various functions blocks of the RPH 132. Although the CF 224 is shown only in communication with the combiner 210, in various exemplary embodiment, the CF 224 communicates with other components of the RPH 132 to provide configuration parameters as necessary.

Figure 3:
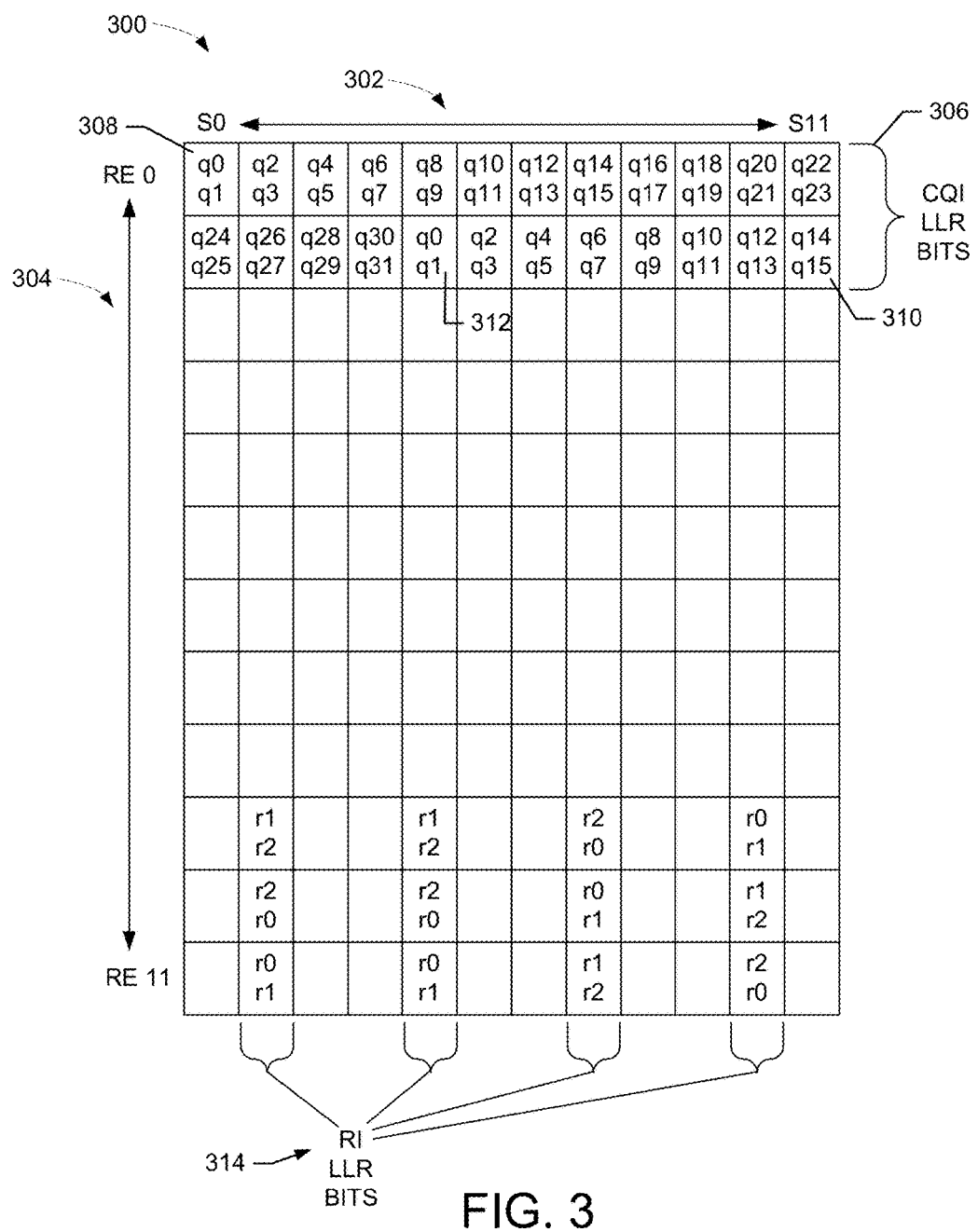
FIG. 3 shows an exemplary subframe that includes resource elements containing bits representing CQI and RI information transmitted from a UE.

FIG. 3 shows an exemplary subframe 300 that includes LLR bits representing CQI and RI information transmitted from a UE. For example, the bits represent the CQI value and RI value in the control information 126 transmitted from the UE 104.

The subframe 300 comprises twelve symbols 302 for each row of resource elements (RE) 304. In an exemplary embodiment, each symbol comprises bits representing two values. For example, the first two rows of REs 306 represent 32 LLR bits of CQI information where the first 15 bits are repeated. It should be noted that the subframe 300 in FIG. 3 is exemplary and that other configurations with different numbers of REs, bits, and bit arrangements for the CQI information are possible.

In an exemplary embodiment, the CQI value is Reed-Muller (RM) coded at the transmitter based on the RI value. It should be noted that in one embodiment, if the payload size of the CQI value is less than or equal to 11 bits, then RM coding is used. Otherwise, the CQI value may go through tail biting convolutional coding, which is not discussed in this description. In an exemplary embodiment, the combiner 210 supports soft combining when the CQI information is RM coded.

At the UE transmitter, the 32-bit RM encoded stream is circularly repeated until the CQI information has NL*QCQI number of bits in total, where, NL is the number of layers for the transport block used for CQI transmission. The circularly repeated CQI, which has NL*QCQI number of bits, is next mapped onto the transport block. After transport block mapping and subsequent layer mapping is complete, information becomes ready for transmission.

Note that when UE transmits two transport blocks, CQI is mapped to the transport block with the highest modulation order. In case both transport blocks have the same modulation order, CQI is mapped on the transport block with the lowest index. QCQI is determined by a parameter called Q'CQI and the modulation order of the transport block used for CQI transmission. If RI and CQI information are transmitted on the same PUSCH, the number of CQI bits depends on the transmitted RI. Thus, the subframe 300 also comprises RI LLR bits 314 that represent an RI value.

In conventional systems, the RI value is used to determine the number of bits to be used for the CQI value. Once this number is determined, the CQI bits are soft-combined to determine a CQI bit stream to be decoded. Thus, the RI value is determined and this result is then used to soft-combine the CQI value.

In an exemplary embodiment, the HG 118 operates to generate a plurality of hypothetical RI values that can be used to soft-combine the CQI bits to generate a plurality of possible CQI bit streams. This process occurs concurrently or simultaneously with combining and decoding the RI value. Once the RI value is determined, the corresponding CQI bit stream can be selected from the plurality of possible CQI bit streams that have been generated. The determined CQI bit stream is then decoded and passed to a downstream decoder with the decoded RI value. Soft-combining the CQI and RI bits simultaneously is more efficient than in conventional systems that use a sequential process.

Figure 4:
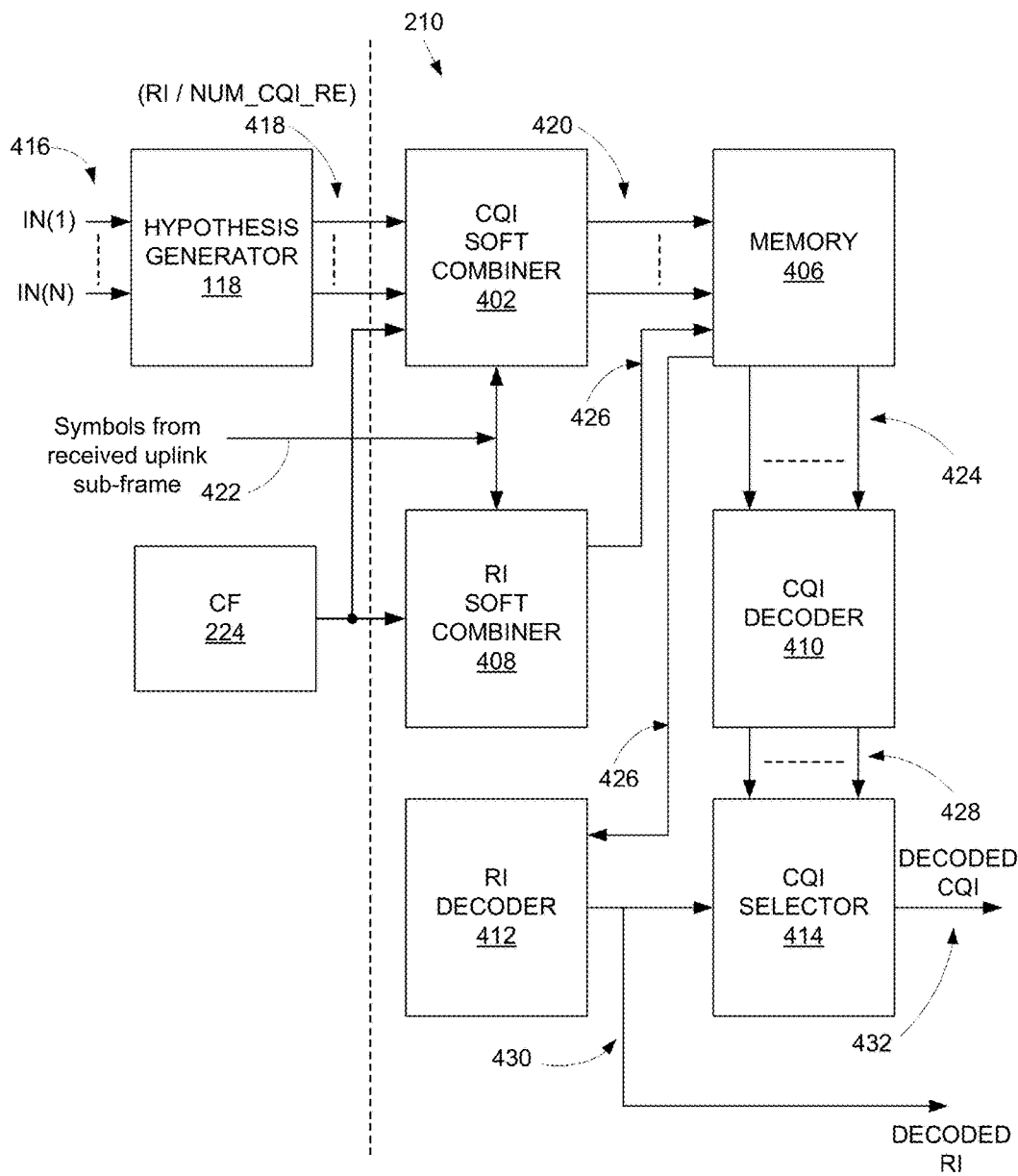
FIG. 4 shows a detailed exemplary embodiment of a soft-combiner that receives hypothetical RI values from an exemplary embodiment of a hypothesis generator.

FIG. 4 shows a detailed exemplary embodiment of the soft-combiner 210 that receives hypothetical RI values from an exemplary embodiment of the hypothesis generator 118. The soft-combiner 210 comprises CQI soft-combiner 402, memory 406, RI soft-combiner 408, CQI decoder 410, RI decoder 412 and CQI selector 414. Although shown separately, the components of FIG. 4 also can be combined in any combination and/or arrangement within the scope of the embodiments. It should be noted that the underlying concept of the exemplary embodiments of the present invention would not change if one or more components were added or removed from soft-combiner 210 shown in FIG. 4.

The hypothesis generator 118 operates to receive parameter inputs 416 and generate a plurality of hypothetical RI values and associated parameters 418 based on these inputs. In one aspect, the bit width of the reported CQI information is derived from the rank of the communication channel, i.e., the RI value reported in the uplink transmission. For some report occasions, simultaneous transmission of the RI and CQI reports is likely over the same PUSCH subframe. Since the number of CQI bits is decided conditioned on the reported RI value over the same PUSCH subframe, decoding of the RI value typically occurs before soft-combining of the CQI bits. Traditionally, explicit RI information is recovered in advance for successfully recovering and soft-combining the RM encoded CQI bits to be fed into RM decoder at the receiver side. Extracting the RI information requires an additional decoding step. Typically, decoding takes place after the soft combining considering the natural flow of signal processing. Hence, this is inefficient. However, exemplary embodiments of the invention overcome this inefficiency.

In an exemplary embodiment, the hypothesis generator 118 generates multiple hypothetical RI values that are taken into consideration when soft-combining the CQI LLRs output from the descrambler 208. For example, multiple RI values are generated that are likely for a given transmission scheme that identifies, for instance, a transmission mode and number of antenna ports. In an exemplary embodiment, CQI soft-combining is performed for up to 8 possible (hypothetical) RI values dependent upon the determined transmission scheme. As discussed below, the correct soft combined CQI bit stream is selected subsequently once the actual RI value is decoded.

The CQI soft-combiner 402 receives the hypothetical RI values and associated parameters 418 and the CQI symbols in the received subframe. The CQI soft-combiner 402 performs soft combining on the CQI symbols in the subframe 422 based on the multiple RI values it receives. Thus, for each hypothetical RI value, the CQI soft-combiner 402 generates a hypothetical soft-combined CQI bit stream. The generated hypothetical CQI soft-combine bit streams 420 are then stored in the memory 406.

In an exemplary embodiment, the CQI soft combiner 402 receives one or more hypothetical RI values and each RI value is associated with a "number of CQI resource elements" (NUM_CQI_RE) parameter. The NUM_CQI_RE parameters indicates how many resource elements in the subframe contain CQI LLR bits to be soft-combined for the associated RI value. For example, referring to FIG. 3, there are 24 resource elements that contain CQI LLR bits. The first resource element is 308 and the last resource element is 310. During soft-combing, the LLR bit "q0" in RE 308 is combined with the LLR bit "q0" in RE 312, and so forth to soft-combine the CQI LLR bits. Thus, the LLR bits in the 24 REs are soft combined to form a 32-bit CQI bit stream that is stored in the memory 406. Additional soft combined streams are generated for each hypothetic RI value based on the associated NUM_CQI_RE value. For example, given the transmission scheme, four hypothetic RI values may be generated by the hypothesis generator 118. Each RI value has an associated NUM_CQI_RE parameter that is used to determine how to soft-combine CQI LLR bits in the subframe to produce a soft-combined CQI bit stream. For each hypothetical RI generated one soft-combined CQI bit stream will be produced and stored in the memory 406.

In an exemplary embodiment, the CQI soft combiner 402 also receives configuration parameters from the CF 224. These parameters also may indicate how the LLR bits in the REs are to be soft-combined. For example, the REs containing CQI bits may not be contiguous in the subframe and the parameters from the CF 224 may indicate the location of the REs to be used in the soft combining process. For example, the RI LLR bits in the subframe may occupy a large portion of the subframe such that the CQI REs are not contiguous. The soft combiner 402 operates to receive parameters from the CF 224 such that for each hypothetical RI the correct REs (whether contiguous or not) are used in the soft combining process to generate the soft combined CQI bit stream.

The RI soft-combiner 408 operates to receive the RI symbols in the subframe 422 and soft-combine these RI symbols to generate a soft-combined RI bit stream 426 that is stored in the memory 406. In an exemplary embodiment, the CQI soft-combiner 402 and the RI soft-combiner 408 operate concurrently or in parallel to soft combine LLR bits in the received subframe. The CQI soft-combiner 402 and the RI soft-combiner 408 also receive configuration parameters as needed from the CF 224.

The CQI decoder 410 operates to obtain the plurality soft-combined CQI bit streams from the memory 406 and decode these bit streams to generate a plurality of CQI decoded values 428 that are input to the CQI selector 414.

The RI decoder 412 operates to obtain the soft-combined RI bit stream from the memory 406 and decode this bit stream to generate a decoded RI value 430 that is input to the CQI selector 414 and also output from the combiner 210.

The CQI selector 414 operates to receive the plurality of decoded CQI values and selects a particular CQI value based on the decoded RI value 430. Thus, the selected CQI value is the value that would have been determined based on the decoded RI value. The decoded CQI value 432 and the decoded RI value 430 are then output from the combiner 210.

Figure 5A:
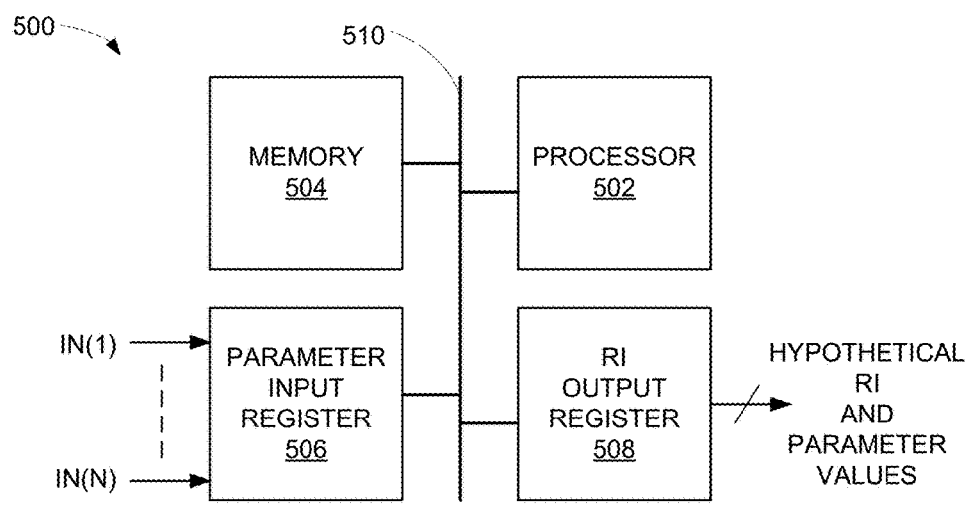
FIG. 5A shows an exemplary embodiment of a hypothesis generator.

FIG. 5A shows an exemplary embodiment of a hypothesis generator 500. For example, the hypothesis generator 500 is suitable for use as the hypothesis generator 118 shown in FIG. 4. The hypothesis generator 500 comprises processor 502, memory 504, input register 506 and RI output register 508, all communicating over bus 510.

The input register 506 receives various transmission parameters, such as the number of antenna ports and transmission mode. The input register 506 passes the received information to the processor 502. The processor 502 uses the received input parameters to determine a transmission scheme. For example, a table that cross references the input parameters with transmission schemes is stored in the memory 504. The processor 502 accesses this table in the memory 504 to determine the appropriate transmission scheme based on the received input parameters.

The processor 502 then uses the determined transmission scheme to determine possible (hypothetical) RI values. For example, in an exemplary embodiment, the processor 502 accesses another table in the memory 504 with the determined transmission scheme to determine possible RI values. Each possible RI value for a given transmission scheme includes a parameter (NUM_CQI_RE) that indicates a number of resource elements containing CQI bits to be soft-combined for that RI value.

Thus, the hypothesis generator 500 operates to receive various inputs at the input register 506, determine a transmission scheme from the received inputs, and then use the transmission scheme to determine hypothetical (possible) RI values and associated NUM_CQI_RE parameters that are output from the output register 508 to the CQI soft combiner.

Figure 5B:
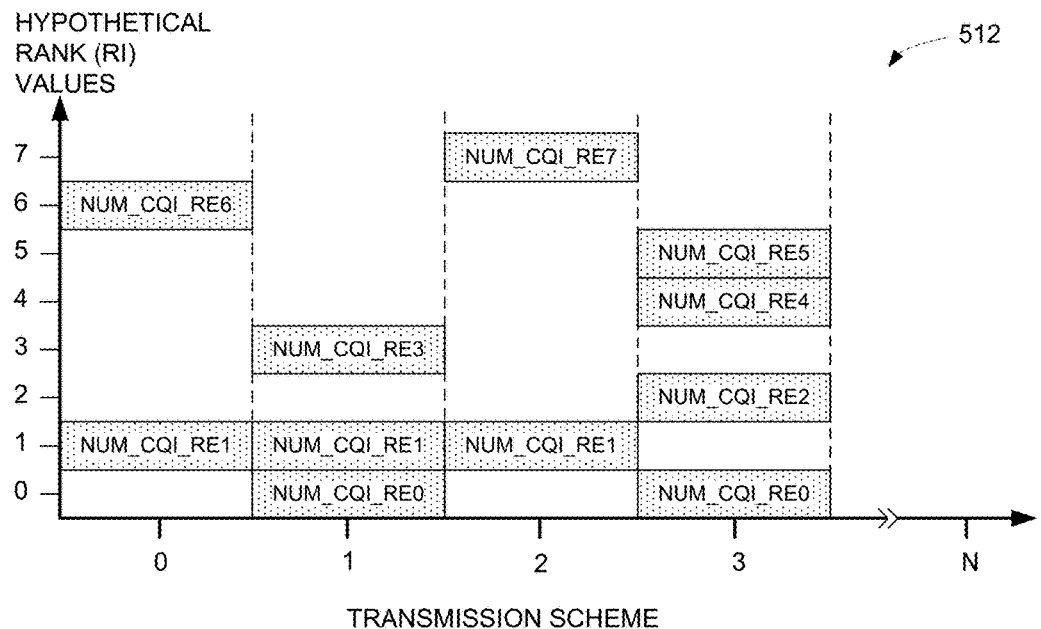
FIG. 5B shows an exemplary embodiment of a table that indicates a number of resource elements containing CQI bits to be combined for a given RI hypothesis.

FIG. 5B shows an exemplary embodiment of a table 512 that indicates a number of REs containing CQI bits to be combined for a given RI hypothesis and transmission scheme. For example, the table 512 indicates up to N transmission schemes on the horizontal axis and eight hypothetical RI values on the vertical axis. For each transmission scheme there are one or more possible RI values that have table entries. Each table entry indicates a number of REs containing CQI bits to be combined. Thus, for example, a transmission scheme of (1) has three corresponding hypothetical RI values (0, 1, 3) which each have corresponding parameters that indicate a number of REs containing CQI bits to be combined (e.g., NUM_CQI_RE0, NUM_CQI_RE1, and NUM_CQI_RE3).

Referring again to FIG. 5A, the table 512 is stored in the memory 504. The processor 502 uses the determined transmission scheme value to access the table 512 in the memory 504 to determine the hypothetical RI values and their corresponding parameters. This information is then output from the output register 508 to the CQI soft-combiner 402, which uses this information to soft-combine CQI bit streams for each of the hypothetical RI values that are determined. For instance, when the transmission scheme is determined to be (1), then three hypothetical RI values will be determined from the table 512 and their associated NUM_CQI_RE parameters will be used by the soft-combiner 402 to soft-combine three CQI bit streams based on those three parameters. The soft-combined bit streams are then stored in the memory 406.

Figure 6:
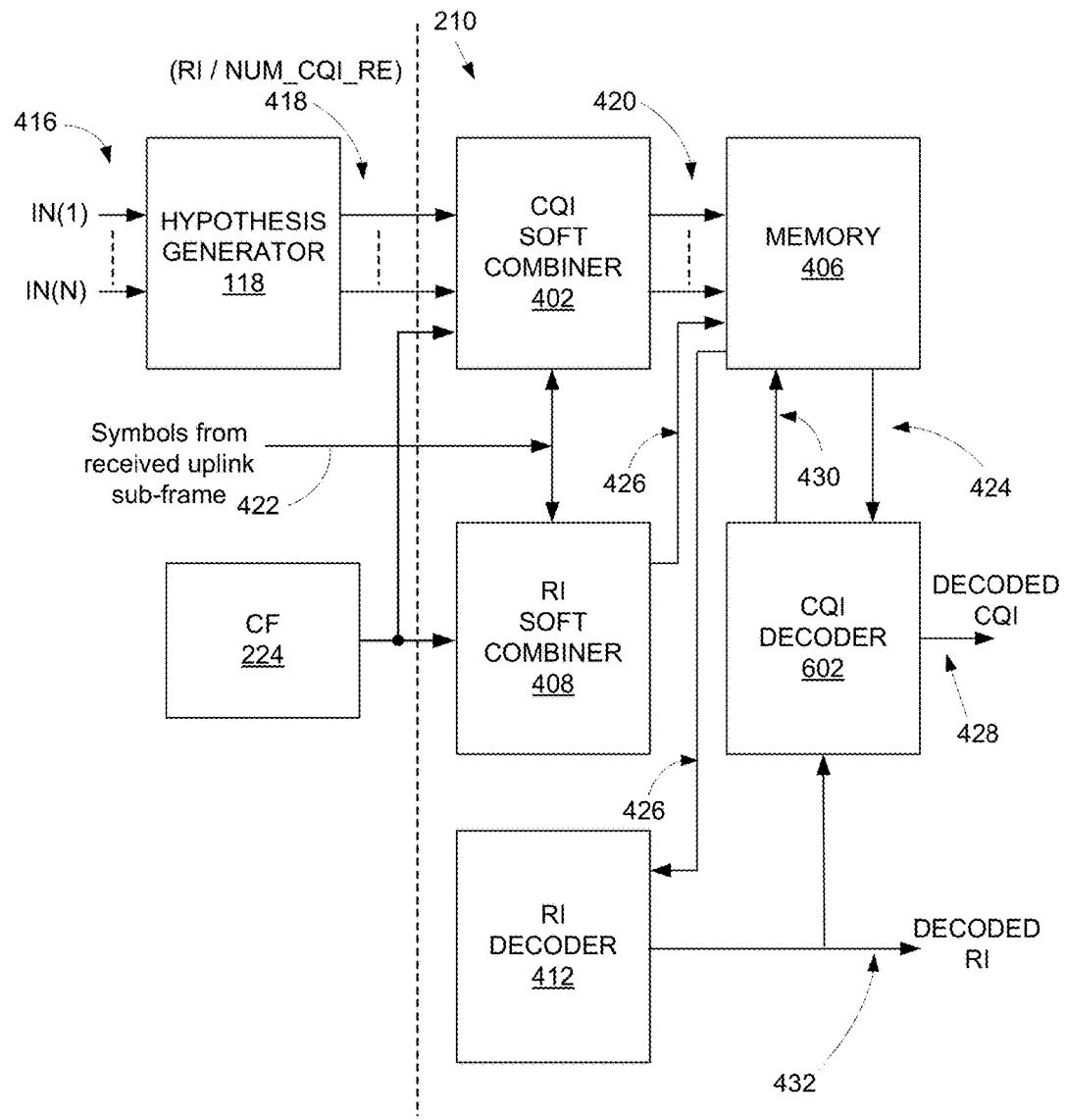
FIG. 6 shows a detailed embodiment of soft-combiner that receives hypothetical RI values from an exemplary embodiment of a hypothesis generator.

FIG. 6 shows a detailed exemplary embodiment of the soft-combiner 210 that receives hypothetical RI values from an exemplary embodiment of the hypothesis generator 118. In an exemplary embodiment, the implementation shown in FIG. 6 is a variation of the implementation shown in FIG. 4. For example, FIG. 6 is the same as FIG. 4, except that the CQI decoder 602 operates to receive the decoded RI value 432 and uses this value to access the memory 406 (see memory access 430) to retrieve the correct soft-combined CQI bit stream 424. The CQI decoder 602 then decodes the retrieved CQI bit stream 424 to generate a decoded CQI value 428 that is output from the decoder. Thus, in this embodiment, only the correct soft-combined CQI bit stream is decoded and output. In the embodiment shown in FIG. 4, all the soft-combined CQI bit streams are decoded and only the correct one is selected for output.

Figure 7:
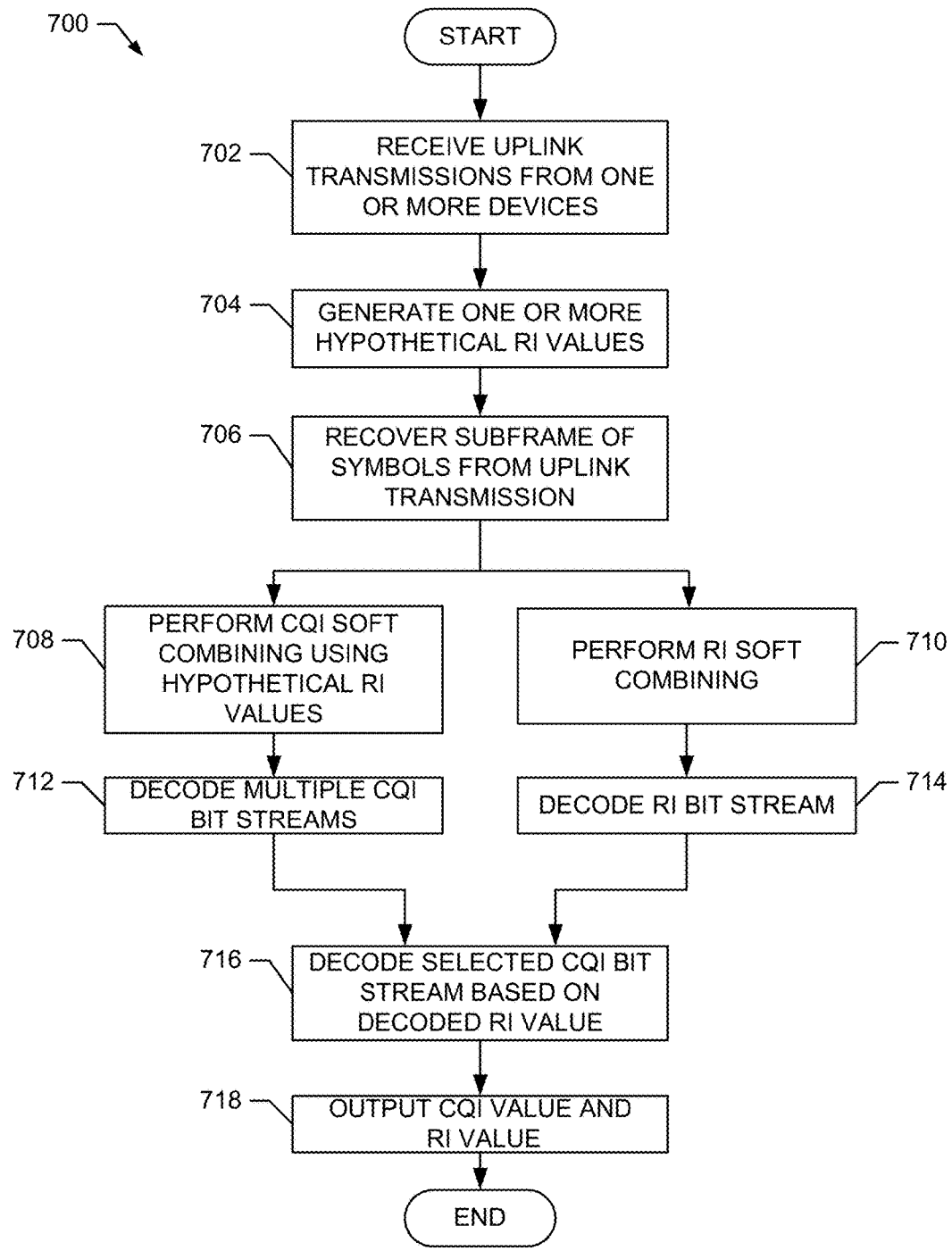
FIG. 7 shows an exemplary method for combining CQI information using an exemplary embodiment of a hypothesis generator in accordance with an exemplary embodiment of the present invention.

FIG. 7 shows an exemplary method for combining CQI information using an exemplary embodiment of a hypothesis generator in accordance with an exemplary embodiment of the present invention.

At block 702, an uplink transmission is received from one or more UEs. For example, uplink transmissions are received at the server 114 from the devices 104, 106 shown in FIG. 1. The uplink transmission includes control information, such as control information 126, 124 received in a PUSCH.

At block 704, one or more hypothetical RIs are generated. For example, the HG 118 generates the hypothetical RIs from parameters input to the HG 118. The parameters include, but are not limited to the transmission mode and number of antenna ports. In one embodiment, the processor 502 is capable of identifying all possible RI values and their associated parameters for a determined transmission scheme by using the table 512.

At block 706, a subframe of symbols is recovered from the uplink transmission. For example, the RHP 132 shown in FIG. 2 receives the uplink transmissions at the ULFE 212 and processes the transmissions using the MMSE 202, IDFT 204, demapper 206 and descrambler 208 to generate the subframe of received symbols that are input to combiner 210. For example, the subframe 300 is generated.

At block 708, CQI soft combining is performed using the CQI LLR bits in the subframe and the hypothetical RI values and associated parameters. For example, for each RI value, the CQI LLR bits in the subframe are soft-combined to generate a hypothetical CQI soft-combined bit streams. If there are six hypothetical RI values, then there will be six hypothetical soft-combined CQI bit streams that result. For example, the soft combining is based on the (NUM_CQI_RE) parameters associated with each hypothetical RI value. These bits streams are stored in a memory, such as the memory 406.

At block 710, in a process that operates concurrently or in parallel with block 708, RI soft combining is performed using the RI LLR bits in the subframe. For example, the RI LLR bits in the received subframe 300 are soft-combined to form a soft-combined RI bit stream.

At block 712, the multiple soft-combined CQI bit streams are decoded to form multiple decoded CQI values. For example, the decoder 410 receives all of the hypothetical CQI bit streams from the memory 406 and decodes each one to generate the multiple decoded CQI values.

At block 714, the soft-combined RI bit stream is decoded to form a decoded RI value. For example, the decoder 412 receives the soft-combined RI bit streams from the memory 406 and decodes this bit stream to generate the decoded RI value.

At block 716, one decoded CQI value is selected based on the decoded RI value. For example, the selector 414 selects the decoded CQI value that corresponds to the decoded RI value.

At block 718, the selected decoded CQI value and RI value are output from the signal combiner 210.

Thus, the method 700 operates to efficiently combine CQI information using an exemplary embodiment of a hypothesis generator in accordance with one embodiment of the present invention.

Figure 8:
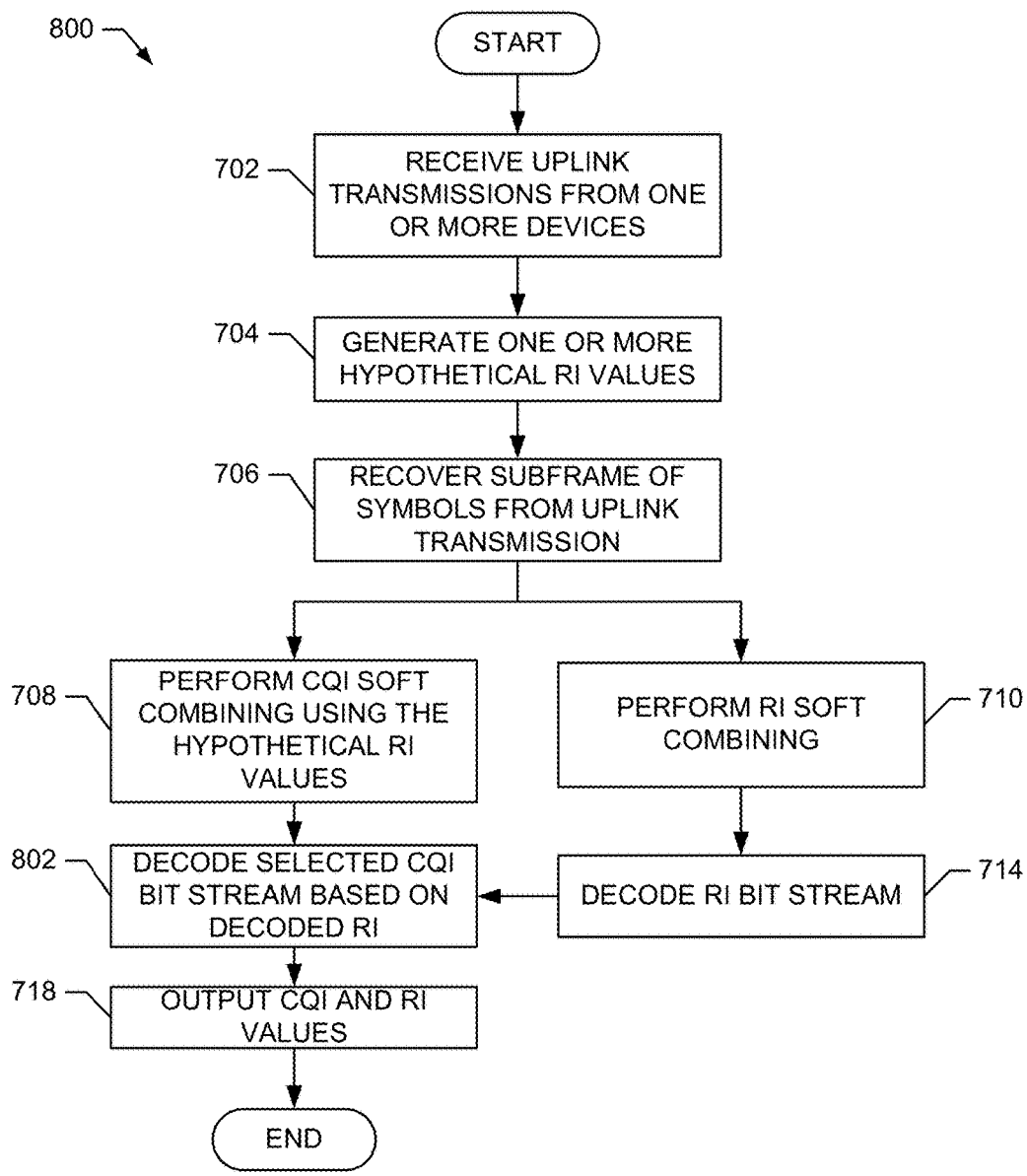
FIG. 8 shows an exemplary method for combining CQI information using an exemplary embodiment of a hypothesis generator in accordance with an exemplary embodiment of the present invention.

FIG. 8 shows an exemplary method for combining CQI information using an exemplary embodiment of a hypothesis generator in accordance with one embodiment of the present invention. The method 800 is a variation of the method 700. Thus, any operations not described below with reference to FIG. 8 are described above with reference to FIG. 7.

At block 714, the soft-combined RI bit stream is decoded to form a decoded RI value. For example, the decoder 412 receives the soft-combined RI bit stream and decodes this value to generate the decoded RI value. In the method 800, the decoded RI value is input to the decoder 602 instead of the selector 414.

At block 802, one of the hypothetical soft-combined CQI bit streams is selected and decoded. For example, the decoder 602 uses the received decoded RI value 432 to select a particular hypothetical soft-combined CQI bit stream from the memory 406 for decoding. In an exemplary embodiment, the decoder 602 accesses the memory 406 (see memory access 426) to obtain the selected soft-combined CQI bit stream 424. The decoder then decodes only this single soft-combined CQI bit stream 424 to obtain the decoded CQI value.

At block 718, the decoded soft-combined CQI value 428 and decoded RI value 432 are output from the signal combiner 210.

Thus, the method 800 operates to efficiently recover a CQI value in a received uplink symbol subframe using a hypothesis generator in accordance with one embodiment of the present invention.

Figure 9:
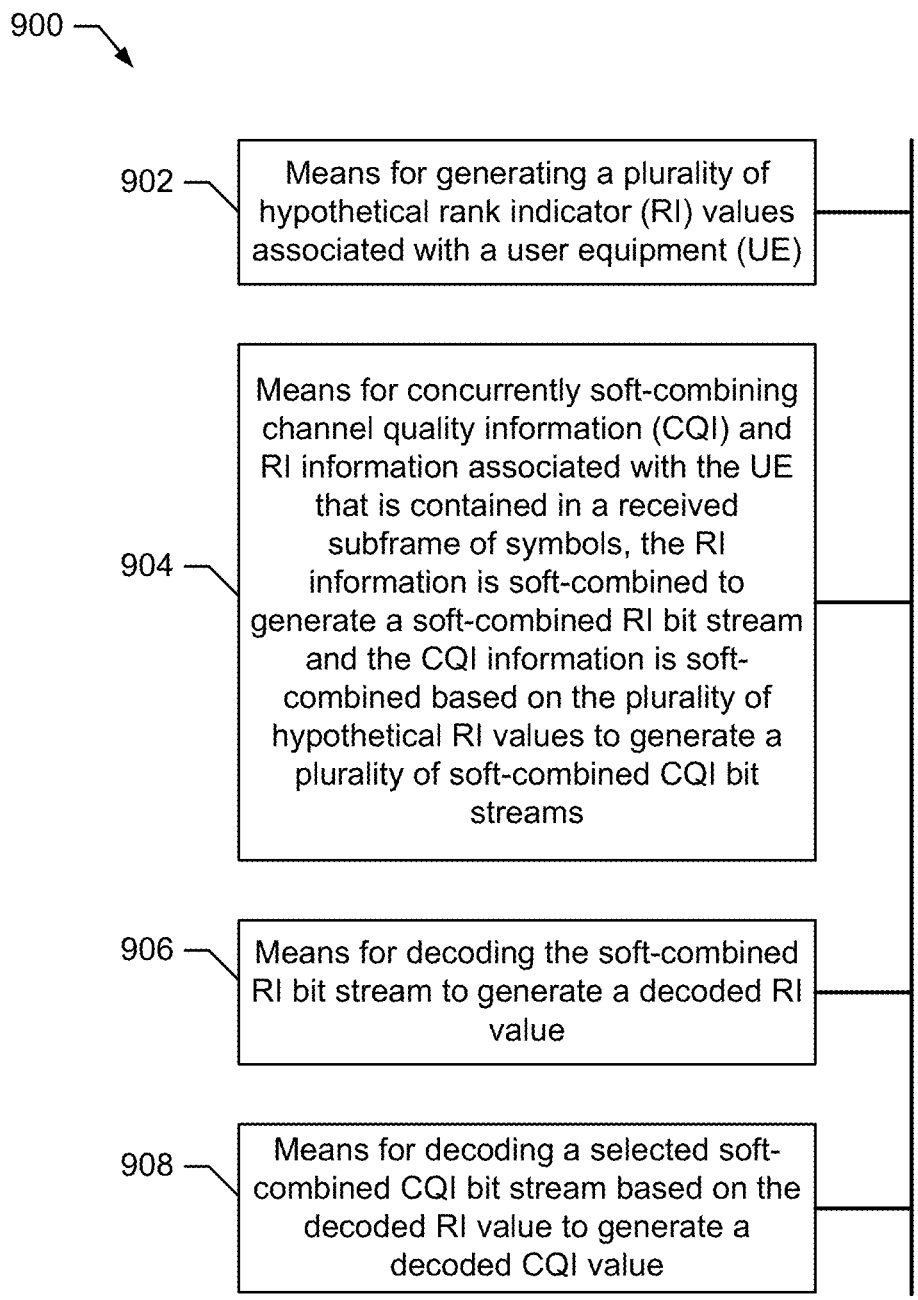
FIG. 9 shows an exemplary embodiment of an apparatus that efficiently soft-combines CQI information based on hypothetical RI values.

FIG. 9 shows an exemplary embodiment of an apparatus 900 that efficiently soft-combines CQI information based on hypothetical RI values in accordance with one embodiment of the present invention.

The apparatus 900 includes means 902 for generating a plurality of hypothetical rank indicator (RI) values associated with a user equipment (UE), which in an exemplary embodiment comprises the hypothesis generator 500.

The apparatus 900 also includes means 904 for concurrently soft-combining channel quality information (CQI) and RI information associated with the UE that is contained in a received subframe of symbols, wherein the RI information is soft-combined to generate a soft-combined RI bit stream and the CQI information is soft-combined based on the plurality of hypothetical RI values to generate a plurality of soft-combined CQI bit streams, respectively, which in an exemplary embodiment comprises the RI soft combiner 408 and the CQI soft combiner 402.

The apparatus 900 also includes means 906 for decoding the soft-combined RI bit stream to generate a decoded RI value, which in an exemplary embodiment comprises the RI decoder 412.

The apparatus 900 also includes means 908 for decoding a selected soft-combined CQI bit stream based on the decoded RI value to generate a decoded CQI value, which in an exemplary embodiment comprises the CQI decoder 410.

Thus, the apparatus 900 operates to efficiently soft-combine CQI information in a received uplink subframe using a hypothesis generator in accordance with one embodiment of the present invention.

The exemplary aspect of the present invention includes various processing steps as described above. The steps may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method, comprising:
generating a plurality of hypothetical rank indicator (RI) values associated with a user equipment (UE);
concurrently soft-combining channel quality information (CQI) and RI information associated with the UE that are contained in a received sub-frame of symbols, wherein the RI information is soft-combined to generate a soft-combined RI bit stream and the CQI information is soft-combined based on the plurality of hypothetical RI values to generate a plurality of soft-combined CQI bit streams, respectively;
decoding the soft-combined RI bits stream to generate a decoded RI value; and
decoding a selected soft-combined CQI bit stream based on the decoded RI value to generate a decoded CQI value, wherein the decoding the selected soft-combined CQI bit stream includes decoding the plurality of soft-combined CQI bits streams to generate a plurality of decoded soft-combined CQI values and selecting the decoded CQI value from the plurality of decoded soft-combined CQI values based on the decoded RI value.

2. The method of claim 1, wherein generating the plurality of hypothetical RI values comprises:
receiving inputs comprising a transmission mode and a number of antenna ports; and
cross referencing a memory using the inputs to obtain the plurality of hypothetical RI values.

3. The method of claim 1, further comprising storing the plurality of soft-combined CQI bit streams in a memory.

4. The method of claim 1, further comprising receiving the sub-frame of symbols in an uplink transmission from the UE.

5. The method of claim 4, the uplink transmission comprising an LTE uplink transmission.

6. The method of claim 4, the uplink transmission received over a physical uplink shared channel ("PUSCH").

7. The method of claim 1, performing the method for a plurality of UE.

8. An apparatus, comprising:
a hypothetical RI generator that generates a plurality of hypothetical rank indicator (RI) values associated with a user equipment (UE);
a first soft-combiner that soft-combines channel quality information (CQI) associated with the UE that is contained in a received sub-frame of symbols, wherein the CQI information is soft-combined using the plurality of hypothetical RI values to generate a plurality of soft-combined CQI bit streams;
a second soft-combiner that soft-combines RI information associated with the UE that is contained in the received sub-frame of symbols, wherein the RI information is soft-combined to generate a soft-combined RI bit stream, and wherein the first soft combiner operates concurrently with the second soft-combiner;
a first decoder that decodes the soft-combined RI bit stream to generate a decoded RI value; and a second decoder that decodes a selected soft-combined CQI bit stream based on the decoded RI value to generate a decoded CQI value, wherein the second decoder includes a CQI decoder that decodes the plurality of soft-combined CQI bit streams to generate a plurality of decoded soft-combined CQI values and a selector that selects the decoded CQI value from the plurality of decoded soft-combined CQI values based on the decoded RI value.

9. The apparatus of claim 8, wherein the hypothetical RI generator comprises:
an input register that receives inputs comprising a transmission mode, a number of antenna ports value relating to transmission mode, number of transmission antennas, number of receiving antennas, and number of channels within a session; and
a processor that cross-references a memory using the inputs to obtain the plurality of hypothetical RI values.

10. The apparatus of claim 8, further comprising a memory that stores the plurality of soft-combined CQI bit streams.

11. The apparatus of claim 8, further comprising a receiver that receives the sub-frame of symbols in an uplink transmission from the UE.

12. The apparatus of claim 11, the uplink transmission comprising an LTE uplink transmission.

13. The apparatus of claim 11, the uplink transmission received over a physical uplink shared channel ("PUSCH").

14. A method, comprising:
generating a plurality of hypothetical rank indicator (RI) values associated with a user equipment (UE);
concurrently soft-combining channel quality information (CQI) and RI information associated with the UE that are contained in a received sub-frame of symbols, wherein the RI information is soft-combined to generate a soft-combined RI bit stream and the CQI information is soft-combined based on the plurality of hypothetical RI values to generate a plurality of soft-combined CQI bit streams, respectively;
decoding the soft-combined RI bits stream to generate a decoded RI value; and
decoding a selected soft-combined CQI bit stream based on the decoded RI value to generate a decoded CQI value, wherein the decoding the selected soft-combined CQI bit stream includes selecting the selected soft-combined CQI bit stream based on the decoded RI value and decoding the selected soft-combined CQI bit stream to generate the decoded CQI value.

15. The method of claim 14, wherein generating the plurality of hypothetical RI values comprises:
receiving inputs comprising a transmission mode and a number of antenna ports; and
cross referencing a memory using the inputs to obtain the plurality of hypothetical RI values.

16. The method of claim 14, further comprising storing the plurality of soft-combined CQI bit streams in a memory.

17. The method of claim 14, further comprising receiving the sub-frame of symbols in an uplink transmission from the UE.

18. The method of claim 17, the uplink transmission comprising an LTE uplink transmission.

19. An apparatus, comprising:
a hypothetical RI generator that generates a plurality of hypothetical rank indicator (RI) values associated with a user equipment (UE);
a first soft-combiner that soft-combines channel quality information (CQI) associated with the UE that is contained in a received sub-frame of symbols, wherein the CQI information is soft-combined using the plurality of hypothetical RI values to generate a plurality of soft-combined CQI bit streams;
a second soft-combiner that soft-combines RI information associated with the UE that is contained in the received sub-frame of symbols, wherein the RI information is soft-combined to generate a soft-combined RI bit stream, and wherein the first soft combiner operates concurrently with the second soft-combiner;
a first decoder that decodes the soft-combined RI bit stream to generate a decoded RI value; and
a second decoder that decodes a selected soft-combined CQI bit stream based on the decoded RI value to generate a decoded CQI value, wherein the second decoder includes a selector that selects the selected soft-combined CQI bit stream based on the decoded RI value and a CQI decoder that decodes the selected soft-combined CQI bit stream to generate the decoded CQI value.

20. The apparatus of claim 19, wherein the hypothetical RI generator comprises:
an input register that receives inputs comprising a transmission mode, a number of antenna ports value relating to transmission mode, number transmission antennas, number of receiving antennas, and number channels within a session; and
a processor that cross-references a memory using the inputs to obtain the plurality of hypothetical RI values.

21. The apparatus of claim 19, further comprising a memory that stores the plurality of soft-combined CQI bit streams.

22. The apparatus of claim 19, further comprising a receiver that receives the sub-frame of symbols in an uplink transmission from the UE.

23. The apparatus of claim 22, the uplink transmission comprising an LTE uplink transmission.

* * * * *